United States Patent
O'Brien

(10) Patent No.: US 7,045,042 B2
(45) Date of Patent: May 16, 2006

(54) GAS-COLLECTING ELECTRETS AS MAGNETO-ELECTROLYSIS CELL COMPONENTS

(76) Inventor: Robert N O'Brien, 2614 Queenswood Dr, Victoria, B.C. (CA), V8N 1X5

( * ) Notice: Subject to any disclaimer, the term of this patent is extended or adjusted under 35 U.S.C. 154(b) by 761 days.

(21) Appl. No.: 09/985,206

(22) Filed: Nov. 2, 2001

(65) Prior Publication Data

US 2004/0195089 A1 Oct. 7, 2004

(51) Int. Cl.
*C25D 17/00* (2006.01)
*C25B 1/04* (2006.01)

(52) U.S. Cl. .................. 204/256; 204/258; 204/266; 204/270; 205/628

(58) Field of Classification Search ............... 204/256, 204/258, 266, 270, 278; 205/628, 630
See application file for complete search history.

(56) References Cited

U.S. PATENT DOCUMENTS

| | | | | |
|---|---|---|---|---|
| 3,930,151 A | * | 12/1975 | Shibata et al. | 204/258 |
| 3,969,214 A | * | 7/1976 | Harris | 204/241 |
| 4,014,777 A | * | 3/1977 | Brown | 204/228.5 |
| 4,105,528 A | * | 8/1978 | Hasebe | 204/237 |
| 4,271,004 A | * | 6/1981 | Cunningham et al. | 204/266 |
| 4,554,076 A | * | 11/1985 | Speaker | 210/639 |
| 4,747,925 A | | 5/1988 | Hasebe et al. | |
| 5,051,157 A | | 9/1991 | O'Brien et al. | |
| 5,240,569 A | | 8/1993 | Waldron | |
| 6,194,093 B1 | | 2/2001 | O'Brien | |

OTHER PUBLICATIONS

R.N. O'Brien & K.J. Lashington Mature, Physical Sciences, 243, 117(1973) p5, 1 26, 00 16 (N.M).
P. J. Kideo & C. W. Tobias, J. Electrochem Soc. 127, 288 (1980) p. 4 1 16, 0011 (N.M.).

* cited by examiner

*Primary Examiner*—Roy King
*Assistant Examiner*—W. T. Leader

(57) ABSTRACT

A tank-type water electrolysis apparatus with unipolar electrodes arrangement and wherein imposed magnetic fields enhance electrolyte solution circulation, further enhanced in apparatus operation by use of immersed electrets providing partitioning structure between seperated hydrogen bubbles-producing and oxygen bubbles-producing regions in the solution. The included immersed electrets, which may be of polytetrafluoroethylene or other suitable material, perform the functions of attracting bubbles away from points of origination at the electrodes, and of promoting coelescence of smaller bubbles into larger ones of greater buoyancy.

3 Claims, 4 Drawing Sheets

GAS-COLLECTING ELECTRETS AS MAGNETO-ELECTROLYSIS CELL COMPONENTS

BACKGROUND OF THE INVENTION—TECHNICAL FIELD

This invention relates to electrolysis cells wherein the intended products of an electrolytic process enacted are gases, hydrogen and oxygen for example. The invention more particularly relates to special means for collecting the gases formed as bubbles on the two kinds of electrode, ie., anode and cathode, when used in specially contrived cells wherein the usual electrolytic process is enhanced by imposition of a suitably arranged magnetic field in the vicinity of electrodes and the electrolyte. The term 'magneto-electrolysis cells' applies with technical accuracy to such magnetically enhanced electrolysis cells.

Although the invention clearly manifests in a major aspect typical characteristics and features of a magneto-electrolysis cell, the most novel major aspect is the incorporation, in combination with features pertaining to magnetic field enhancement of the electrolytic process, of specially contrived partitioning components emplaced in cell structures between cathodes and anodes, constituting a new kind of separators or spacers having special below-described properties that will be effective with regard to improved gas collection.

BACKGROUND OF THE INVENTION—RELATED ART

There exists a growing repertoire of approaches to enhancing a wide variety of electrolytic processes by imposing magnetic fields, ie., by some type of magneto-electrolysis technique, whether improved gas collection is the specific technical aim or not. Investigations of various effects of magnetic fields on electrolytic processes have been published in scientific literature by many workers in the art, including the present inventor, who has also contributed to expanding knowledge via U.S. Pat. No. 5,051,157 and U.S. Pat. No. 6,194,093. The earlier patent disclosed magnetic particles embedded in specially contrived spacers between anode and cathode pairs, whereas the more recent patent discloses emplacement of permanent magnet components within electrode assemblies. The special separators described hereinafter are especially suitable for combination with known features of cells following teachings of the later, rather than the earlier, of the two just-cited patents.

However, remaining viable and readily combinable with what is disclosed as new hereinafter, is the present inventor's proposal to add indifferent paramagnetic ions to an already basically effective electrolyte solution in order to magnify stirring enhancement from magneto-electrolysis effect, as he taught in the earlier patent and related journal publications. Both in several scientific journal publications and the above cited patents, of which the contents pertaining to magnetic field effects are herewith incorporated by reference, the inventor has drawn attention to magnetically induced thinning of the convective diffusion layer in aqueous electrolyte solution immediately adjacent electrodes. A diffusion layer so thinned is closely associated with and occurs concurrently with increased convective motion of liquid electrolytes, stirring the electrolyte in a manner effective for minimizing undesirable gradients of electrolyte concentration. Among the various advantages reportedly obtained by constructing magneto-electrolysis cells for use to replace ordinary electrolysis cells that do not have the imposed magnetic fields are: reduction of impressed voltage needed for the electrolytic production of definite amounts of substances; suppression of the growth of dendrites that can cause short circuiting; smoother electroplated deposits; cooling of electrodes which keeps their electronic conductivity desirably high; the reduction of resistance of the electrolyte by improving ion mobility; and maximized active electrode site utilization. Procuring the last-mentioned advantage is closely associated with minimizing gradients of electrolyte concentration and with avoiding concentration polarization.

Optimized charging of secondary batteries, which is of course an instance of electrolysis, has been described by several different workers in the art, in connection with a number of novel secondary battery construction proposals incorporating magnetic field-generating features. In none of such cases where optimized charging is sought, however, do the associated technical aims include enhancement of gas bubble production at electrodes, because significant amounts of gassing at a secondary battery electrode, typically the gassing of hydrogen bubbles, usually indicates charging to have either been substantially accomplished or else that it is being improperly conducted at too high a current density. Gas-collecting electrets as magneto-electrolysis cell components

BACKGROUND OF THE INVENTION—TECHNICAL FIELD

This invention relates to electrolysis cells wherein the intended products of an electrolytic process enacted are gases, hydrogen and oxygen for example. The invention more particularly relates to special means for collecting the gases formed as bubbles on the two kinds of electrode, ie., anode and cathode, when used in specially contrived cells wherein the usual electrolytic process is enhanced by imposition of a suitably arranged magnetic field in the vicinity of electrodes and the electrolyte. The term 'magneto-electrolysis cells' applies with technical accuracy to such magnetically enhanced electrolysis cells.

Although the invention clearly manifests in a major aspect typical characteristics and features of a magneto-electrolysis cell, the most novel major aspect is the incorporation, in combination with features pertaining to magnetic field enhancement of the electrolytic process, of specially contrived partitioning components emplaced in cell structures between cathodes and anodes, constituting a new kind of separators or spacers having special below-described properties that will be effective with regard to improved gas collection.

BACKGROUND OF THE INVENTION—RELATED ART

There exists a growing repertoire of approaches to enhancing a wide variety of electrolytic processes by imposing magnetic fields, ie., by some type of magneto-electrolysis technique, whether improved gas collection is the specific technical aim or not. Investigations of various effects of magnetic fields on electrolytic processes have been published in scientific literature by many workers in the art, including the present inventor, who has also contributed to expanding knowledge via U.S. Pat. No. 5,051,157 and U.S. Pat. No. 6,194,093. The earlier patent disclosed magnetic particles embedded in specially contrived spacers between anode and cathode pairs, whereas the more recent patent discloses emplacement of permanent magnet components within electrode assemblies. The special separators described hereinafter are especially suitable for combination with known features of cells following teachings of the later, rather than the earlier, of the two just-cited patents.

However, remaining viable, and readily combinable with what is disclosed as new hereinafter, is the present inventor's proposal to add indifferent paramagnetic ions to an already basically effective electrolyte solution in order to magnify stirring enhancement from magneto-electrolysis effect, as he taught in the earlier patent and related journal publications.

Both in several scientific journal publications and the above cited patents, of which the contents pertaining to magnetic field effects are herewith incorporated by reference, the inventor has drawn attention to magnetically induced thinning of the convective diffusion layer in aqueous electrolyte solution immediately adjacent electrodes. A diffusion layer so thinned is closely associated with and occurs concurrently with increased convective motion of liquid electrolytes, stirring the electrolyte in a manner effective for minimizing undesirable gradients of electrolyte concentration. Among the various advantages reportedly obtained by constructing magneto-electrolysis cells for use to replace ordinary electrolysis cells that do not have the imposed magnetic fields are: reduction of impressed voltage needed for the electrolytic production of definite amounts of substances; suppression of the growth of dendrites that can cause short circuiting; smoother electroplated deposits; cooling of electrodes which keeps their electronic conductivity desirably high; the reduction of resistance of the electrolyte by is proving ion mobility; and maximized active electrode site utilization. Procuring the last-mentioned advantage is closely associated with minimizing gradients of electrolyte concentration and with avoiding concentration polarization.

Optimized charging of secondary batteries, which is, of course, an instance of electrolysis, has been described by several different workers in the art, in connection with a number of novel secondary battery construction proposals incorporating magnetic field-generating features. In none of such cases where optimized charging is sought, however, do the associated technical aims include enhancement of gas bubble production at electrodes, because significant amounts of gassing at a secondary battery electrode, typically the gassing of hydrogen bubbles, usually indicates charging to have either been substantially accomplished or else that it is being improperly conducted at too high a current density.

Imposing a magnetic field specifically to procure beneficial effect for a water electrolysis cell producing hydrogen and oxygen has been taught by Hasebe et al, U.S. Pat. No. 4,747,925 (31 May 1988). The Hasebe et al patent teaches detachment of smaller gas bubbles earlier from their formation sites, in contrast to having to allow time for the bubbles to grow in individual size until buoyancy suffices to eventually cause the detachment. That basic concept of imposing a magnetic field to mitigate inadequate $_1$b ble buoyancy is not unique to the Hasebo et al patent, and has been adopted by Waldron in his U.S. Pat. No. 5,240,569 (31 Aug. 1993).

Before its detachment, each bubble formed at an electrode clearly occludes its own formation site, postponing—for as long as it remains there—the formation of a successor bubble at the same site. An additional aspect of bubble growth while attached concerns the individual expansion of the electrically insulative spherical packets of gas that the bubbles are.
A growing sphere increasingly blocks off otherwise possible avenues of ionic transport through the bulk volume of liquid electrolyte solution and towards a bubbles-occluded electrode surface. In order to reach and discharge at active sites on electrodes, ions in the electrolyte solution have to go around still-attached expanding bubbles. in order to reach those sites, as well as having to go around already detached bubbles rising through the solution. Both circumstances contribute to increased cell resistance by diminishing electrolytic conduction.

A further factor concerning bubble formation in an electrolysis cell apparently has received little attention, namely, concerning a surface chemistry-related and very ubiquitous phenomenon that concentrations of solution constituents cannot be the same at surfaces as in the bulk volume of solution remote from surfaces. Presence of bubbles unavoidably means presence of surfaces. To substitute a multitude of smaller bubbles for a lesser number at a larger size, although capable of procuring the same volume of contained gas, cannot avoid inherently creating a huge increase in area of available submerged surfaces where solution constituents are apt to localize at a different concentration than that away from those surfaces. A usually expected magneto-electrolysis effect of promoting uniformity of concentration throughout an electrolyte solution therefore tends to be countered by a greatly increased area of submerged bubble surfaces.

The ratio of bubble surface area to bubble-contained gas volume therefore represents a heretofore apparently never-mentioned parameter that can limit the extent to which a mutually cooperative influence is reasonable to expect between the two distinct effects of promoting smaller, earlier detached bubbles, on the one hand, and, on the other hand, promoting solution uniformity. As means for ensuring that these two distinct effects of an imposed magnetic field do not so undesirably work counter to one another as to adversely affect gas collection from a magneto-electrolysis cell, some means other than the imposition of the magnetic field causing both effects is desirable to develop.

In course of seeking appropriate non-magnetic means for combination with magnetic means in the aforementioned regard, there must be taken into account a known distortion of electric field potential that occurs around a bubble at an electrode surface, in the manner illustrated schematically in a figure accompanying the article, "Primary Potential and Current Distribution Around a Bubble on an Electrode", P. J. Sides and C. W. Tobias, *Journal of the Electrochemical Socìety*, volume 127, page 288 et seq (1980).

Although experimental cells used in the investigation of Sides and Tobias into bubbles sited at electrodes were not magneto-electrolysis cells, the same manner of distortion of electric field potential around bubbles would occur whether an imposed magnetic field were present or not. A clear implication to which attention is now drawn is that benefits of employing magneto-electrolysis techniques to diminish cell resistance for cells having a purely liquid-phase electrolyte solution cannot be the same when there is a a two-phase suspension comprising gas bubbles which are electrically insulative spheres, suspended in surrounding electrolytically conductive liquid.

Thus, although the inventor accepts that the early detachment of bubbles from electrodes, when their buoyancy would as yet be inadequate to cause the detachment, is desirable for electrode de-occluding and some resistance-reducing effects, he perceives no way in which the approach of the above-cited Sasebo et al patent addresses the problem of distortion of electric field potential due to presence of bubbles. It appears merely the well known convection-enhancing effect which is responsible for sweeping away the small bubbles from their formation sites.

In any event, a swarm of ascending smaller-than-usual bubbles will inevitably manifest a larger ratio of bubble surface area to contained gas volume than if fewer and larger bubbles containing the same amount of gas were rising.

Thus, the above-mentioned tendency for electrolyte solution constituents to be present at bubble surfaces in a different concentration than in the bulk of liquid is also not addressed by any relevant prior art insofar as the present inventor is aware. Furthermore, another unaddressed problem has particular pertinence to gas-producing cells having vertical plate-type electrodes. At any given volume element imagined in a horizontal position between electrodes at a given height in the cell, with the element containing detached as well as attached bubbles, there will be more bubbles present at a given instant than in a similar volume element at a lower height, since more bubbles present will have risen from lower levels, the higher the level considered. This circumstance cannot plausibly support assuming the process of transverse electrolytic conduction between a vertical cathode and a vertical anode to be enacted with perfect uniformity at all heights.

Before concluding discussion of related art, existence is noted of a wide variety of specially contrived partitioning components for placement between electrodes in gas-producing electrolysis cells. Used in such components are materials like polyethylene and polytetrafluoroethylene (PTFE) that inherently possess dielectric properties and susceptibility to being made into electrets. In view of the nature of the present invention, the inventor's contribution in 1973 to publication of research investigating an immersed PTFE electret warrants mention. "Ionic Double-layer Adsorption on Immersed Electrets by Laser Interferometry", by R. N. O'Brien and K. J. Lushington, *Nature, Physical Science*, volume 243, page 117 et seq (1973) discussed PTFE electret stability when immersed in a potassium iodide solution, and provided methodology for correlating extent of adsorption of potassium iodide molecules by the immersed electret with electret charge. In view of the article, plus advances over intervening years, at present it would be within the skill of those versed in the art to make any similar calculations that may arise in connection with carrying out the present invention.

BRIEF SUMMARY OF THE INVENTION

Basically, what is proposed as an advance in construction of magneto-electrolysis cells intended for production of gases is to include, as a gas-collecting partition between electrodes on which gas bubbles form, an immersed electret constituted by a suitably charged sheet of suitable material, such as PTFE or an appropriate electronic grade of polyethylene, or other high electrical resistance polymer capable of being made into an electret. The functions of such a partition are multi-faceted and include already well known channeling and separating functions respecting the produced gases, but now adding unanticipated functions of (1) attracting bubbles away from their sites of formation on electrode surfaces, and (2) causing many small bubbles drawn towards the electret partition to coelesce into fewer and larger bubbles of gas that, in harmony with the foregoing (1) function will rise in courses removed at a greater lateral distance from sites of formation of the originally smaller bubbles, preferably formed on vertical plate electrodes. Influences on movement and on coelescence of gas bubbles are gained by making the partition as an electret, and these influences both enhance expected beneficial effects of magneto-electrolysis techniques taught in prior art, and also introduce a non-magnetic means for exerting control over the extent to which plural effects of imposing a magnetic field can tend to counteract one another in the manner briefly discussed above. Function (2) of causing bubble coelescence affords the sought-for measure of control of the ratio of bubble surface area to gas-containing volume. Function (1), of attracting bubbles away from their formation sites procures a benefit of mitigating an excessive occlusion, in-effect, of electrodes, that would be associated with uninfluenced vertical ascent of bubbles immediately adjacent the electrode surfaces.

The circumstances concerning electric field potential across the span between electrodes, while not altogether escaping distortion due to bubble presence, will not involve so great a non-uniformitarian tendency as would obtain if nothing were done about the surface area-related consequence of having a swarm of insulative bodies, viz., small bubbles. in the most critical region of the cell, viz., immediately adjacent gas-producing sites.

To thoroughly appreciate how the invention per se combines with magneto-electrolysis techniques, including use of indifferent paramagnetic ions, requires consulting the detailed description to follow.

BRIEF DESCRIPTION OF THE DRAWING

FIG. 5 is an enlarged view of dash-encircled region 022 of FIG. 2.

DETAILED DESCRIPTION OF THE INVENTION

Figure 1:
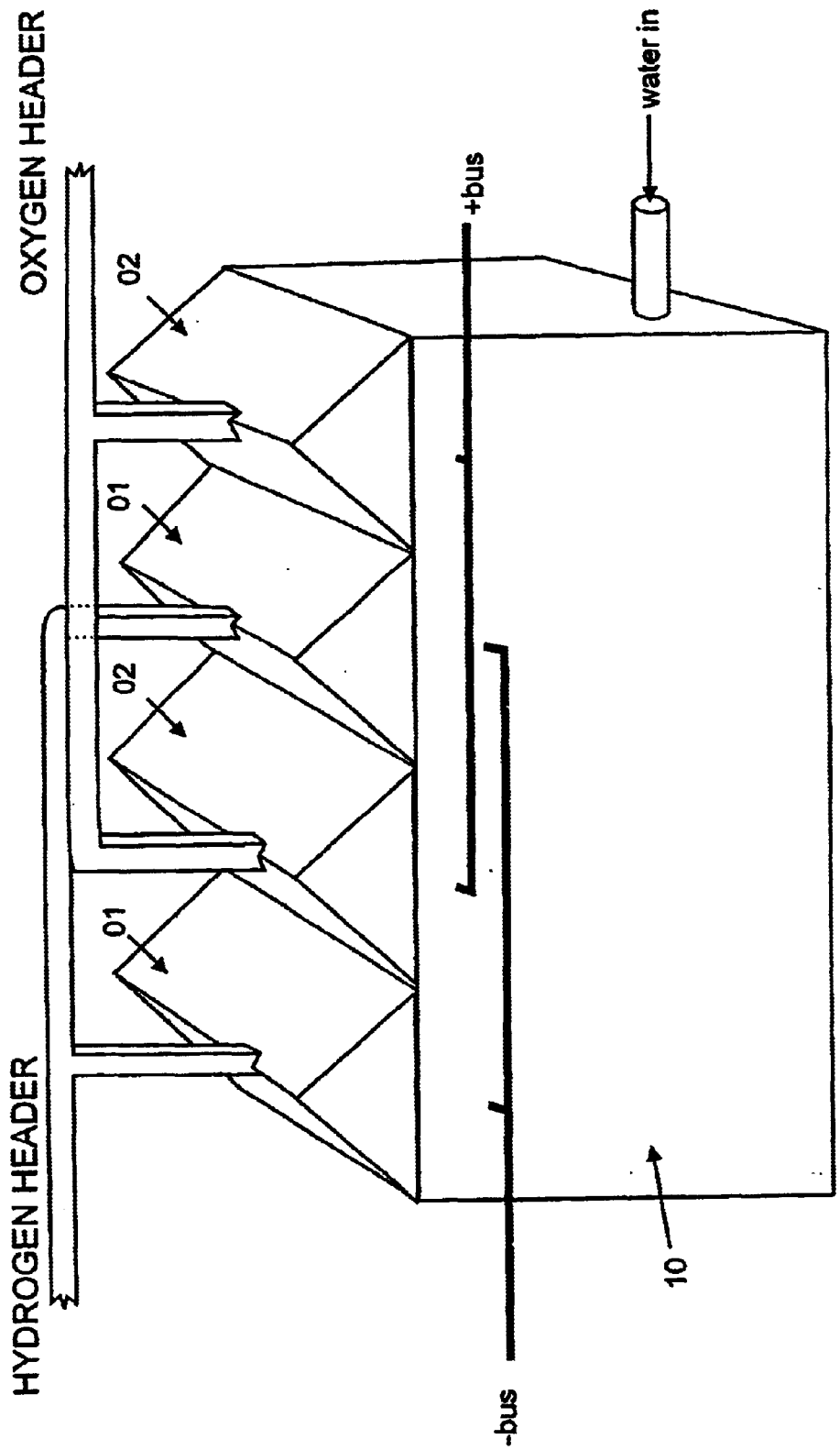
FIG. 1 illustrates by an oblique perspective view a typical and/or basic external appearance of an apparatus for producing gaseous hydrogen and oxygen by the electrolysis of a water solution according to the invention.

It is first noted with reference to what FIG. 1 illustrates that there is no significant departure from the typical external appearance of well known so-called 'unipolar' types of water electrolysis cells. Such cells are commonly topped with rows of bell-like compartments acting as manifolds from which the gases produced below them are withdrawn. Bells 01 in the figure are for collecting hydrogen, and bells 02 are for collecting oxygen. From the generally conventional external appearance, of course, no deductions could be made respecting whether or not either any special use of magnetic field generating means or of electret materials concealed within the apparatus are intended. Since use of both is intended, it is necessary to consult the other figures, which show features of internal construction.

Figure 2:
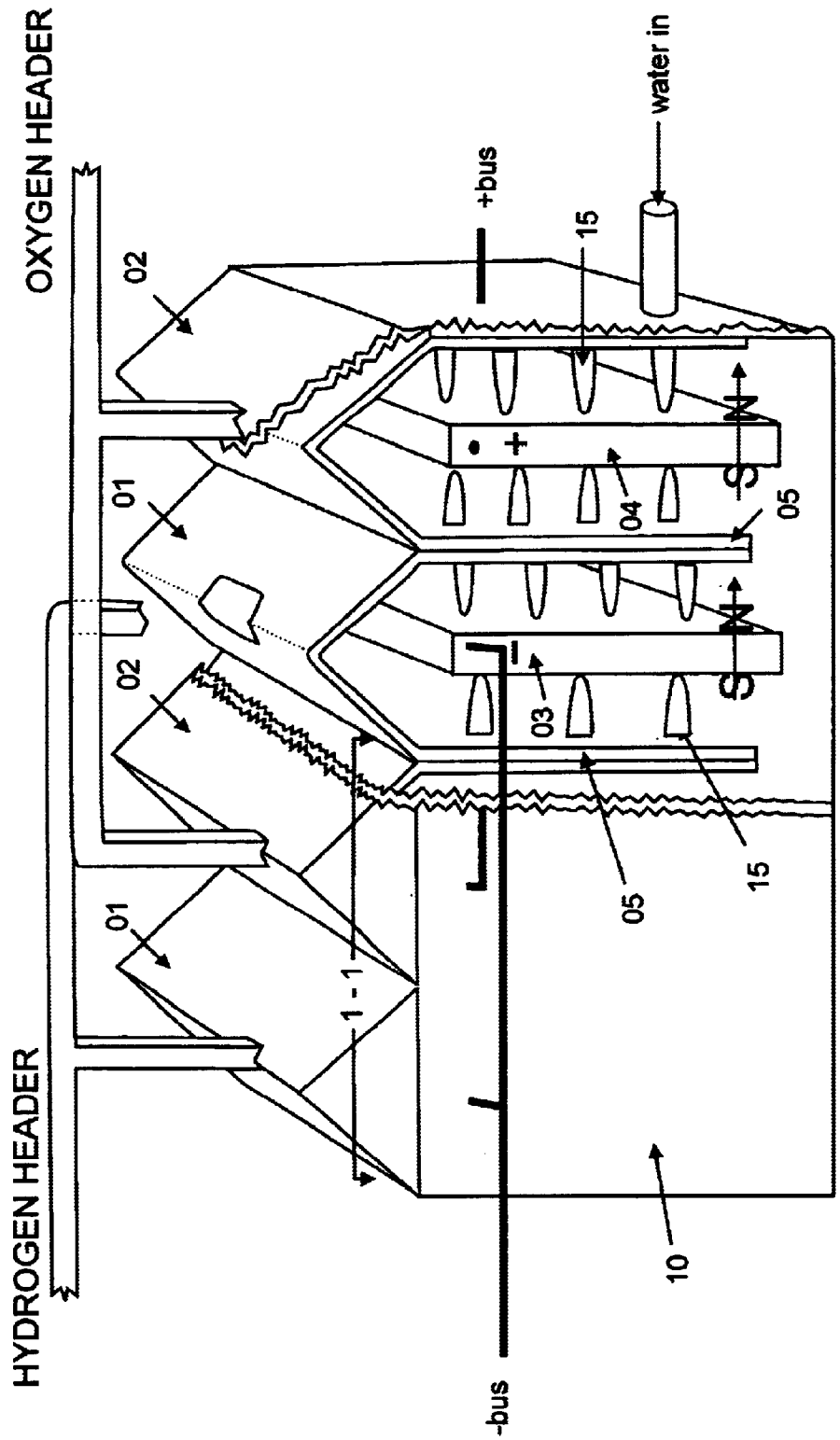
FIG. 2 is a partially half-sectioned elevation view taken at the vertical plane 1—1 indicated in FIG. 1.
Figure 3:
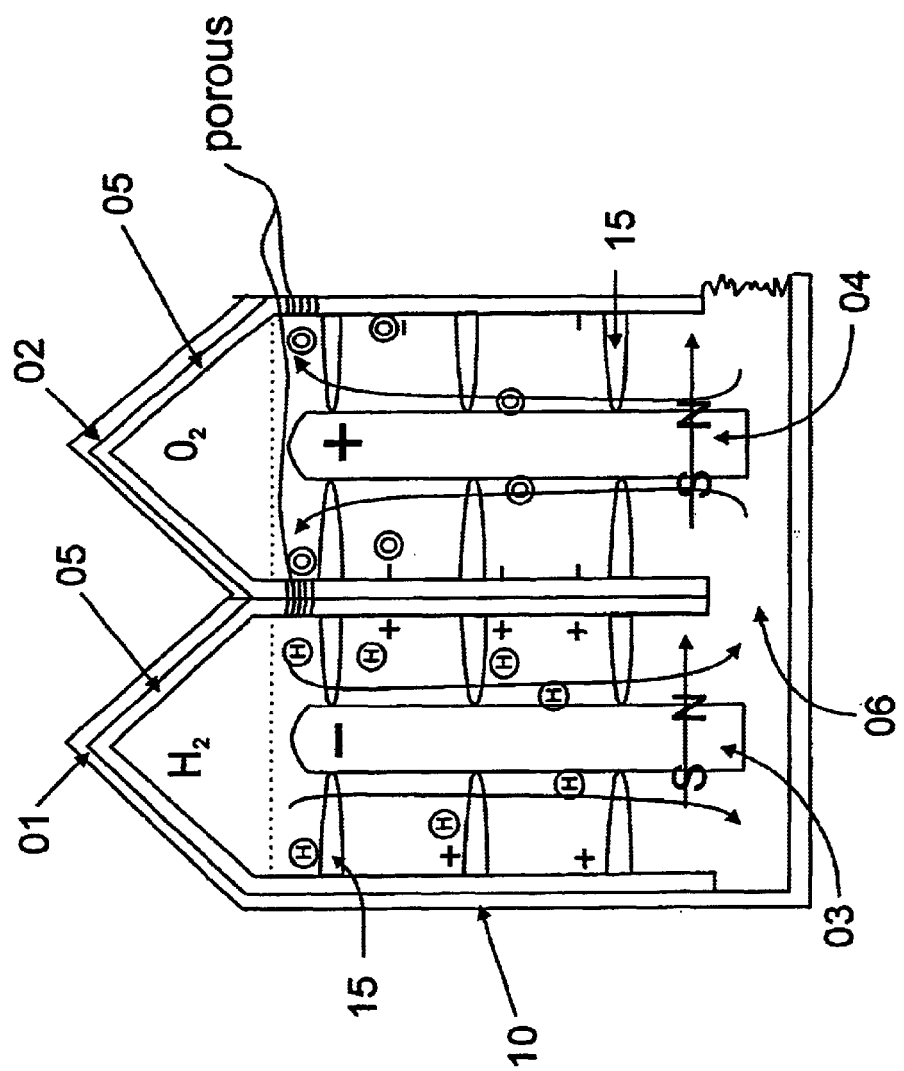
FIG. 3 is a partially sectioned plan view taken at the horizontal plane 2—2 indicated in FIG. 2.
Figure 4:
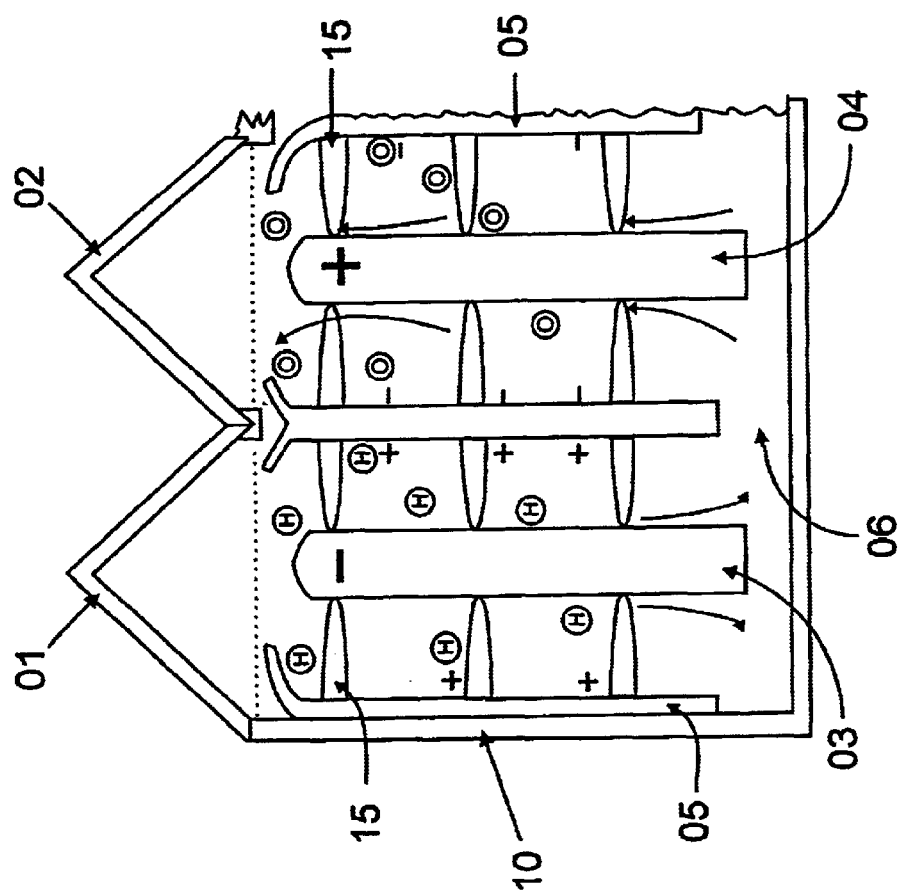
FIG. 4 is an enlarged view of dash-encircled region 021 of FIG. 2.

FIGS. 2 and 3, for reason of need to avoid crowding of features do not depict presence of gas-filled bubbles, as do FIGS. 4 and 5, but their presence during operation of the apparatus, which is the same apparatus for all the FIGS. 1–5, is presumed even where not shown. Similarly, whereas on the one hand, FIGS. 2 and 3 include indications of magnetic field poles N and S in their appropriate relationships to structure, in FIGS. 4 and 5, on the other hand, for simplification and to assist focussing on how electret partitions 05 affect bubble motions and coelescence, the magnetic field pole indications are omitted with the presumption they are present.

Such density-driven convective flows, as is known from prior art pertaining to magneto-electrolysis, are susceptible to enhancement by a suitable application of imposed magnetic fields, with an expected result of vigorously stirring the electrolyte 06.

The foregoing qualitative and basic explanation of the convective flow and associated stirring, however, does not take into account the factor of viscous drag between rising detached bubbles and a flowing electrolyte solution surrounding them. Here it is noted that hydrogen bubbles, were they assumed to ascend in a vertical plane immediately adjacent a cathode 03, would rise against the local direction of liquid flow, whereas, with oxygen bubbles rising adjacent an anode 04, these would rise with the direction of flow. Operation of the present invention changes those particular circumstances by shifting bubble ascent paths laterally away from the surfaces of cathodes 03 and anodes 04, while at the same time increasing detached bubbles' average size by promoting coalescence of smaller bubbles as they are attracted away from points of their initial formation. In two figures showing a few representative bubbles H and 0, see FIGS. 3 and 4, B bubbles contain hydrogen and 0 bubbles contain oxygen, the former originating at cathodes 03, and the latter at anodes 04, as usual in the art.

The unique electret partitions 05 of the invention shown in FIGS. 2, 3, and 4 serve, by exerting attractive force on bubbles, to provide means promoting bubbles' ascent along courses other than immediately adjacent the surfaces where they initially form. Positively charged surfaces of the partitions 05 face cathodes 03 where negatively charged hydrogen bubbles originate, and negatively charged faces face anodes 04 where positively charged oxygen bubbles originate. Contact with these surfaces will also discharge any charge on the bubbles further facilitating coalescence.

Because of the greater buoyancy of enlarged bubbles produced by coalescence of smaller ones colliding during submerged collection at surfaces attracting them, viscous drag effects that otherwise could adversely affect ascent rates become much less important whether it is the one type gas bubble or the other.

With reference to FIGS. 2, 3, and 4, the charged (electret) partitions 05 are preferably consitituted by any formable polymeric material known capable of being made into electrets, such as polytetrafluorodthylene as used in the above cited immersed electrets research, or polyethylene etc.

Usual methods of subjecting sheets of suitable materials to treatment by electrical corona discharges so as to produce electrets are intended to be practiced. The point of having partitions 05 which include electrets is to furnish a force of electrostatic attraction pulling bubbles towards them from sites of initial bubble release from cathodes 03 and anodes 04. The assumption here is that the above-discussed known difference in electric potential about bubbles at electrodes (from the Tobias group's research) entails that the bubbles carry an electric charge at their peripheries, with those originating at cathodes 03 being negatively charged, and those formed at anodes 04 being positively charged. Thus, in order to procure attractive force to usefully influence motions and coalescence of the bubbles, it is necessary to arrange appropriately the faces of electret partitions 05 in the manner already described.

It is intended that the force attracting bubbles toward a partition 05 be stronger than a tendency among like-charged bubbles to mutually repel one another, hence promoting their coalescence into larger bubbles as they strike against charged material of the partitions 05, colliding with one another as they do so, and in many cases possibly even before striking the charged material because of a highly stirred vortices-including electrolyte 06. Such coalescence into larger gas-filled bubbles thus will occur laterally distanced away from cathodes 03 and anodes 04, thereby assurring minimal interference with electrode active sites' utilization, with also a minimized reduction of electrolytic conduction through electrolyte 06. The optimized formation at the active sites of numerous smaller-than-usual gas-filled bubbles, that detach earlier than usual due to magnetic field effects as taught in the prior art of HASEBE ET AL is not sacrificed.

With regard to some differences between the respective forms of electret partitions 05, one form shown in FIG. 3 and another in FIG. 4, it should be understood that these are considered minor and non-essential differences that do not affect basic operability of the invention in the manner already described, near and just beneath the electrolyte solution 06 surface in the FIG. 3 instance, provision is made for use of a porous patch or section of suitably retained-in-place ion-permeable material of any type already well known for use in water electrolyzer diaphragms, ie., the previously taught partitions separating regions of cathodic and anodic activity. The specific form of structure for partition 05 shown in FIG. 4 is an option wherein curved upper portions of submerged structure are used to ensure deflection of the right kind of bubbles properly towards the correct surmounting bells 01 or 02. Note that unobstructed contiguity of regions of liquid electrolyte 06 is provided below both illustrated forms of partitions 05, which are mounted in the tank's casing 10 so as to not reach the floor therewithin.

Another difference of form to note between partitions 05 of FIG. 3 and FIG. 4 is the split, back-to-back structure used for the former, and the one-piece integral structure for the latter. Furthermore, the upper parts of inverted IU shaped sheets fitting into the covering bells 01 and 02, in contrast to their submerged portions forming the partitions 05 as shown in FIGS. 2 and 3, are not essential, being contemplated principally from an ease of assembly standpoint. An illustrated aspect which is the same for both forms of partitions 05 is that the reach or ie. length of occassional projections 15 from staggered locations at the surface planes of partitions 05 provides adequate reach to span distance to electrodes 03 and 04, which are contacted by tips of projections 15 so that a spacing-apart function is mechanically served. To omit this or any equivalent means for the spacing would risk allowing distortion of partitions 05, pulled undesirably towards electrodes 03 and/or 04 by electric attraction. Projections 15, although preferably integral in material structure with formed partitions 05, should not carry electrostatic charge, and this is accomplished best by so charging preinstalled sheets of the material of the partitions 05 that the material,typically polytetrafluoroethylene or polyethylene, will only be made locally an electret in regions between and not including projections 15. It is well within the state of art to produce patchy, so to speak, electret structures. Supplernentary to using uncharged projections 15 for a spacing function, it is possible also to include other means for fixing elements in place, such as clips or grooves built into case 10 (not shown). Regardless of specific forms of partitions 05, inclusion therein of electret portions is always for the purposes of 1. attracting bubbles away from faces of electrode 03 or 04, and 2. promoting coalescence of small bubbles into larger ones.

With regard now to means for utilizing magnetic fields to enhance stirring of electrolyte solution 06, reference may particularly be taken to the above-cited patent of the present inventor wherein, for example, folded internal elements of battery electrode assemblies were of pre-magnetized permanent magnet material. Interior construction of cathodes 03 and anodes 04 has not been shown herein inasmuch as the prior art in the field of magneto-electrolysis is considered already to provide sufficient teachings regarding the matter of magnetic field generation in electrolytic cells.

Otherwise, also concerning features of electrodes 03 and 04, their active gas-producing surfaces may be of usual materials known for the water electrolysis purpose in the art, such as steel or nickel-plated steel, and they also may be built with incorporation of advanced but already known resort to special catalysts, such as ruthenium oxide, and/or they may incorporate special porosity of structures, etc., if desired.

Construction of and arraying of electrical leads systems 20 and 21 respectively to furnish current for electrodes 03 and 04 can of course be in accordance with normal practices respecting negative and positive bus connections, as can inclusion of manifold-like means and gas-collecting headers connected with collecting bells 01 and 02 respectively for hydrogen and oxygen.

There is, in connection with practicing the invention, no intended fundamental departure from normal practices pertaining to basic construction and operation of tank-type water electrolysis apparatuses using a unipolar type arrangement of electrodes positioned in electrolyte solution beneath overhead gas-collecting compartments. The novel aspect of the invention resides in its use of immersed electrets to optimize handling of the gaseous bubbles produced, before their entry into the overhead compartments, ie., in the drawing figures, the bells 01 and 02. The inventor expects that once the skilled practitioners of the art become informed concerning the present disclosure, they will find it easy to make many non-essential modifications to apparatus structure without departing from the spirit and scope of the invention which has been described above with reference to illustrated embodiments that are meant to be representative only and not to excessively limit what can be done within bounds of the invention which are only to be ascertained by referring to the claims that follow, with usual assumptions of appropriate regard for claims interpretation rules and the "doctrine of equivalents"

What is claimed is:

1. A water electrolysis apparatus utilizing an arrangement of vertical planar anodes and cathodes immersed in an electrolyte solution in a tank, in combination with an electrical leads system providing current to said anodes and cathodes, wherein said apparatus is provided means for overhead collecting of gaseous hydrogen and oxygen produced initially as bubbles formed respectively at said cathodes and anodes, wherein also provided are means for imposition of magnetic fields to enhance circulation of said electrolyte solution, wherein also provided are vertically oriented generally planar partititons separating hydrogen bubbles-containing regions of said electrolyte solution from oxygen bubbles-containing regions of said electrolyte solution, wherein included in immersed portions of said partitions are means for electrostatic attraction of negatively charged bubbles of hydrogen toward one face of each of said partitions and for attraction of positively charged bubbles of oxygen toward the opposite face of each partition, and wherein said electrostatic bubbles-attracting means are constituted by sheets of polytetrafluoroethylene or alternatively suitable equivalent materials made into electrets.

2. The apparatus of claim 1, wherein said sheets of polytetrafluoroethylene or alternatively suitable equivalent materials made into electrets are used in pairs placed back-to-back.

3. The apparatus of claim 2, wherein said sheets of polytetrafluoroethylene or alternatively suitable equivalent materials made into electrets and used in pairs placed back-to-back are invertedly U-shaped, and include laterally extending projections of material that reach and contact electrode surfaces and are not electrostatically charged.

* * * * *